United States Patent
Hioda et al.

(10) Patent No.: US 10,442,386 B2
(45) Date of Patent: Oct. 15, 2019

(54) VEHICULAR CURTAIN AIR BAG DEVICE

(71) Applicant: TOYOTA JIDOSHA KABUSHIKI KAISHA, Toyota-shi, Aichi-ken (JP)

(72) Inventors: Seiji Hioda, Chiryu (JP); Kouji Ohara, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 15/679,445

(22) Filed: Aug. 17, 2017

(65) Prior Publication Data

US 2018/0072256 A1 Mar. 15, 2018

(30) Foreign Application Priority Data

Sep. 14, 2016 (JP) ................. 2016-179699

(51) Int. Cl.
*B60R 21/232* (2011.01)
*B60R 21/213* (2011.01)
*B60R 21/231* (2011.01)
*B60R 21/00* (2006.01)
*B60R 21/233* (2006.01)

(52) U.S. Cl.
CPC .......... *B60R 21/232* (2013.01); *B60R 21/213* (2013.01); *B60R 21/231* (2013.01); *B60R 2021/0006* (2013.01); *B60R 2021/0009* (2013.01); *B60R 2021/0018* (2013.01); *B60R 2021/0048* (2013.01); *B60R 2021/23153* (2013.01); *B60R 2021/23308* (2013.01)

(58) Field of Classification Search
USPC ..................................... 280/730.2
See application file for complete search history.

(56) References Cited

U.S. PATENT DOCUMENTS

| | | | |
|---|---|---|---|
| 6,199,898 B1* | 3/2001 | Masuda | B60R 21/232 280/729 |
| 8,622,421 B2* | 1/2014 | Obara | B60R 21/232 280/730.1 |
| 2004/0041376 A1* | 3/2004 | Winkler | B60R 21/232 280/730.2 |
| 2004/0075257 A1 | 4/2004 | Ogawa et al. | |
| 2004/0100077 A1 | 5/2004 | Ogata | |

(Continued)

FOREIGN PATENT DOCUMENTS

| | | |
|---|---|---|
| CN | 105377638 A | 3/2016 |
| JP | 2000-6750 A | 1/2000 |

(Continued)

OTHER PUBLICATIONS https://astamuse.com/ja/published/JP/No/2016043820 (Year: 2016).*

*Primary Examiner* — Paul N Dickson
*Assistant Examiner* — Hilary L Johns
(74) *Attorney, Agent, or Firm* — Oliff PLC

(57) ABSTRACT

There is provided a vehicular curtain air bag device including a curtain air bag, the curtain air bag including: a rear seat chamber that inflates and deploys between a head of a rear seat occupant and a vehicle interior side section from an upper end section of the vehicle interior side section; and a headrest chamber extending from a rear end section of the rear seat chamber, the headrest chamber inflating and deploying between a headrest of a rear seat and the vehicle interior side section in a vehicle width direction.

10 Claims, 11 Drawing Sheets

(56) References Cited

U.S. PATENT DOCUMENTS

| | | | |
|---|---|---|---|
| 2005/0000024 A1* | 1/2005 | Jakubowski | A47O 4/54 5/655.3 |
| 2005/0206138 A1* | 9/2005 | Breuninger | B60R 21/231 280/729 |
| 2007/0241539 A1* | 10/2007 | Jang | B60R 21/213 280/728.2 |
| 2008/0100045 A1* | 5/2008 | Fukawatase | B60R 21/23138 280/730.2 |
| 2008/0238055 A1* | 10/2008 | Hotta | B60R 21/213 280/730.2 |
| 2011/0285117 A1 | 11/2011 | Shamoto | |
| 2012/0102650 A1* | 5/2012 | McGlynn | A61G 1/00 5/627 |
| 2012/0104736 A1* | 5/2012 | Kim | B60R 21/203 280/731 |
| 2014/0042732 A1* | 2/2014 | Taguchi | B60R 21/233 280/729 |
| 2016/0001733 A1* | 1/2016 | Kim | B60R 21/233 280/728.3 |
| 2016/0114755 A1* | 4/2016 | Matsuzaki | B60R 21/207 280/730.2 |
| 2016/0368449 A1 | 12/2016 | Fujiwara | |
| 2017/0291569 A1* | 10/2017 | Sugie | B60R 21/01552 |

FOREIGN PATENT DOCUMENTS

| | | |
|---|---|---|
| JP | 2004-067045 A | 3/2004 |
| JP | 2004-106722 A | 4/2004 |
| JP | 2008-207667 A | 9/2008 |
| JP | 2011-201485 A | 10/2011 |
| JP | 2016043820 A * | 4/2016 |
| WO | 2010/089847 A1 | 8/2010 |

\* cited by examiner

VEHICULAR CURTAIN AIR BAG DEVICE

CROSS-REFERENCE TO RELATED APPLICATION

This application is based on and claims priority under 35 U.S.C. 119 from Japanese Patent Application No. 2016-179699 filed on Sep. 14, 2016, the disclosure of which is incorporated by reference herein.

BACKGROUND

Technical Field

The present invention relates to a vehicular curtain air bag device.

Related Art

In an occupant head protecting air bag device described in WO 2010/089847, a rear end lower section of a rear seat inflating section (rear seat chamber) included in a curtain air bag is coupled to a quarter pillar (C pillar) via a rear side strap. This rear side strap is housed on a vehicle interior outer side of a quarter pillar garnish (C pillar garnish) at a normal time, and is extended by being pulled out to a vehicle interior inner side of the C pillar garnish when the curtain air bag inflates and deploys.

As a result, there is a configuration that a tension line is formed along substantially a belt line on a lower section side of a rear section of the curtain air bag.

Incidentally, during a side collision of a vehicle, a head of a rear seat occupant that moves by inertia to an outer side in a vehicle width direction plunges into the rear seat chamber of the curtain air bag, and in reaction to this, the head of the rear seat occupant and the rear seat chamber rebound to a center side in the vehicle width direction. In a process of this rebound, the rear seat chamber that swings to a center side in the vehicle width direction sometimes continues to press and accelerate the head to a center side in the vehicle width direction. When the accelerated head receives a frictional force from a headrest or seat back of the rear seat, there is a possibility that the head rotates around an axis of a neck and a head rotational injury (Brain Rotational Injury Criterion; so-called BrIC) occurs.

In this respect, in the curtain air bag of the above-described configuration, since the C pillar and the rear end lower section of the rear seat chamber are coupled via the rear side strap, swing to a center side in the vehicle width direction of the rear seat chamber is suppressed. As a result, the above-described kind of acceleration of the head can be prevented or suppressed. However, when the above-described kind of rear side strap is applied, design considerations for pulling out the rear side strap from the C pillar garnish during inflation and deployment of the curtain air bag become required, and design of a C pillar garnish periphery is restricted. In addition, a countermeasure for preventing cracking or shattering of the C pillar garnish also becomes required. Therefore, an arrangement region of the rear side strap becomes limited, and application of the rear side strap is sometimes difficult.

SUMMARY

In view of the above-described facts, the present invention has an object of obtaining a vehicular curtain air bag device which is capable of suppressing swing to a center side in a vehicle width direction of a rear seat chamber without employing a rear side strap.

A vehicular curtain air bag device according to a first aspect of the present invention includes a curtain air bag, the curtain air bag including: a rear seat chamber that inflates and deploys between a head of a rear seat occupant and a vehicle interior side section from an upper end section of the vehicle interior side section; and a headrest chamber extending from a rear end section of the rear seat chamber, the headrest chamber inflating and deploying between a headrest of a rear seat and the vehicle interior side section in a vehicle width direction.

As a result of the first aspect of the present invention, when, for example, a side collision of a vehicle has been detected or predicted, a curtain air bag is inflated and deployed. This curtain air bag includes: a rear seat chamber that inflates and deploys between a head of a rear seat occupant and a vehicle interior side section from an upper end section of the vehicle interior side section; and a headrest chamber extending from a rear end section of the rear seat chamber. The headrest chamber inflates and deploys between a headrest of a rear seat and the vehicle interior side section in a vehicle width direction. Therefore, when the head of the rear seat occupant that moves by inertia to an outer side in the vehicle width direction due to an impact of a side collision plunges into the rear seat chamber, and in reaction to this, the head of the rear seat occupant and the rear seat chamber rebound to a center side in the vehicle width direction, the headrest chamber abuts on the headrest of the rear seat. As a result, swing to a center side in the vehicle width direction of the rear seat chamber is suppressed (restricted), hence the above-described swing can be suppressed without employing a rear side strap.

A vehicular curtain air bag device according to a second aspect of the present invention is that according to the first aspect, wherein the curtain air bag is folded in a vehicle up-down direction to be housed in an upper end section of the vehicle interior side section, and at least a part of the folded headrest chamber is covered from a vehicle interior inner side by a C pillar garnish.

In the invention of the second aspect of the present invention, since the above-described kind of configuration is adopted, it becomes easy to secure a housing space of the headrest chamber extending from the rear end section of the rear seat chamber.

A vehicular curtain air bag device according to a third aspect of the present invention is that according to the first aspect or the second aspect, wherein the headrest chamber is a delay chamber that starts to inflate and deploy later than the rear seat chamber.

In the third aspect of the present invention, since the above-described kind of configuration is adopted, it is possible for the headrest chamber to be inflated and deployed after the headrest chamber has been pulled out to the vehicle interior inner side of the C pillar garnish due to inflation and deployment of the rear seat chamber. This makes it possible to reduce a load received by the C pillar garnish when the headrest chamber is pulled out to the vehicle interior inner side of the C pillar garnish.

A vehicular curtain air bag device according to a fourth aspect of the present invention is that according to any of the first through third aspects, wherein an inflated width of the headrest chamber, in the vehicle width direction, is smaller than that of the rear seat chamber.

In the fourth aspect of the present invention, since the above-described kind of configuration is adopted, it is easy for the headrest chamber to be inflated and deployed in a gap between the headrest of the rear seat and the vehicle interior side section, even when the gap is narrow.

As described above, in the vehicular curtain air bag device according to the present invention, it is possible to suppress swing to a center side in a vehicle width direction of a rear seat chamber without employing a rear side strap.

BRIEF DESCRIPTION OF THE DRAWINGS

Exemplary embodiments of the present invention will be described in detail based on the following figures, wherein.

DETAILED DESCRIPTION

First Embodiment

Figure 1:
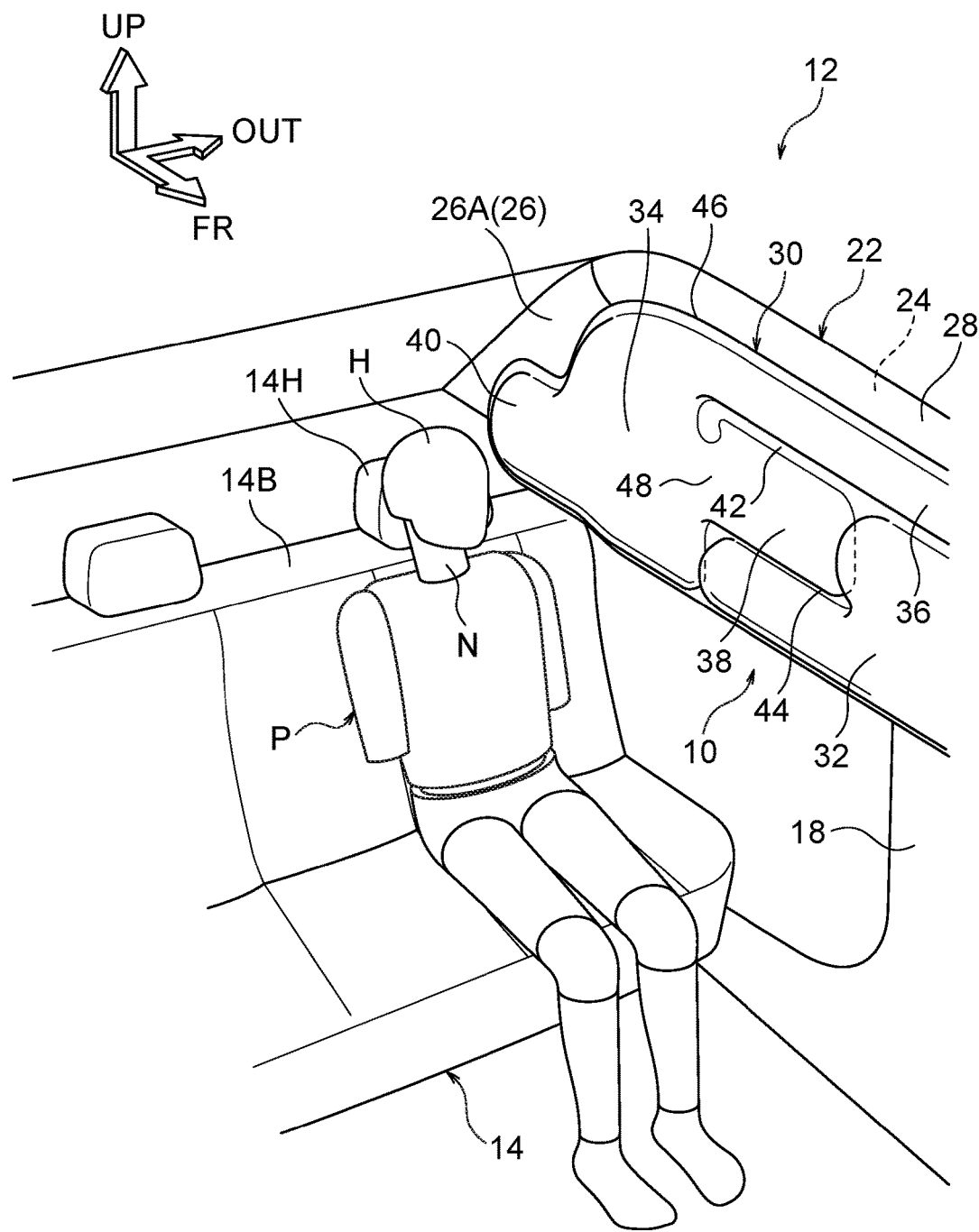
FIG. 1 is a perspective view showing a vehicle interior rear section of an automobile applied with a vehicular curtain air bag device according to a first embodiment of the present invention, and is a view showing a inflated and deployed state of a curtain air bag.

A vehicular curtain air bag device 10 according to a first embodiment of the present invention will be described based on FIGS. 1 to 4. Note that an arrow FR, an arrow UP, and an arrow OUT appropriately marked in each of the drawings indicate, respectively, a frontward direction (direction of travel), an upward direction, and an outer side in a vehicle width direction of an automobile (vehicle) 12 to which the vehicular curtain air bag device 10 has been applied. Hereafter, when description is made using simply directions of front/rear, left/right, and up/down, these are assumed to indicate front/rear in a vehicle front-rear direction, left/right in a vehicle left-right direction (vehicle width direction), and up/down in a vehicle up-down direction, unless otherwise specifically stated.

(Overall Configuration of Vehicular Curtain Air Bag Device 10)

As shown in FIGS. 1 to 4, the vehicular curtain air bag device 10 according to the present embodiment is mounted in the automobile 12 of sedan type, and includes a curtain air bag 30, an inflator 50, and a control device 52. Note that in FIGS. 1 to 4, a collision test dummy doll P is seated in a rear seat 14 of the automobile 12 instead of an actual occupant. Hereafter, this dummy doll P will be referred to as a "rear seat occupant P".

The curtain air bag 30 is formed so as to inflate and deploy in a curtain state along a front side glass 16, a B pillar 18, and a rear side glass 20 that are provided in a vehicle interior side section. An upper edge section of this curtain air bag 30 is provided with an unillustrated plural tabs. These tabs are fixed to an unillustrated A pillar, a roof side rail 24, and a C pillar 26, in a roof side section 22 which is an upper end section of the vehicle interior side section. A configuration of this curtain air bag 30 will be mentioned in detail later.

The inflator 50 is a gas generating device for supplying a gas to inside the curtain air bag 30, is disposed close to an intermediate section in a front-rear direction of the curtain air bag 30, and is fixed to the roof side rail 24 via an unillustrated bracket. A gas jetting section of this inflator 50 is connected to a connecting passage 37 provided in an intermediate section in a longitudinal direction of the curtain air bag 30. There is a configuration whereby when this inflator 50 is actuated, the gas jetted from the above-described gas jetting section is supplied to an inside of the curtain air bag 30.

Note that although in FIGS. 1 to 4, a left side portion in the vehicle interior rear section of the automobile 12 is illustrated, the above-described curtain air bag 30 and inflator 50 are respectively provided in both left and right sides of the automobile 12. In other words, the vehicular curtain air bag device 10 is configured including a left/right pair of curtain air bags 30 and a left/right pair of inflators 50. The left/right inflators 50 are electrically connected to an ECU (Electronic Control Unit) 54 shown in FIG. 2. A side collision sensor 56, a rollover sensor 58, and an oblique collision sensor 60 are electrically connected to this ECU 54. These ECU 54, side collision sensor 56, rollover sensor 58, and oblique collision sensor 60 (all of whose illustration is omitted in drawings other than FIG. 2) configure the control device 52.

The side collision sensor 56 is configured so as to detect or predict (unavoidability of) a side collision of the automobile 12 to output a side collision signal to the ECU 54. The rollover sensor 58 is configured so as to detect or predict (unavoidability of) a rollover of the automobile 12 to output a rollover signal to the ECU 54. Moreover, the oblique collision sensor 60 is configured so as to detect or predict (unavoidability of) an oblique collision of the automobile 12 to output an oblique collision signal to the ECU 54.

The ECU 54 has a configuration in which when inputted with the side collision signal or the oblique collision signal, it actuates the inflator 50 on a side collision side or an oblique collision side (both being a near side). As a result, the curtain air bag 30 on the near side receives a gas supply to be inflated and deployed. In addition, the ECU 54 has a configuration in which when inputted with the rollover signal, it actuates the inflators 50 on both sides in the vehicle width direction. Note that the ECU 54 is configured such that when inputted with the rollover signal after a side collision or after an oblique collision, it actuates the inflator 50 on a side (a far side) opposite to the already actuated near side.

(Configuration of Curtain Air Bag 30)

The above-mentioned curtain air bag 30 is integrally hollow woven by a One Piece Woven (abbreviated to OPW) method, for example. In the OPW method, a Jacquard loom is employed, whereby while two sheets of cloth are being woven, they simultaneously have necessary places multi-woven, thereby forming a seamless bag body. Note that a manufacturing method of the curtain air bag 30 is not limited to the above-described. For example, the curtain air bag 30 may be manufactured by sewing into a bag shape one sheet or a plurality of sheets of a base cloth formed by cutting out a nylon-based or polyester-based cloth material.

This curtain air bag 30 includes: a front seat chamber 32; a rear seat chamber 34; an unillustrated front side oblique collision chamber provided on a frontward side of the front seat chamber 32; a gas supply passage 36 by which the front seat chamber 32 and the rear seat chamber 34 are mutually communicated; a rollover chamber 38 provided between the front seat chamber 32 and the rear seat chamber 34; and a headrest chamber 40 provided on a rearward side of the rear seat chamber 34.

The front seat chamber 32 inflates and deploys between a head of an unillustrated front seat occupant and a vehicle body side section (the front side glass 16), and protects the head of the front seat occupant during a side collision. The front side oblique collision chamber inflates and deploys frontwards of the front seat chamber 32, and protects the head of the front seat occupant during an oblique collision and a rollover. The rear seat chamber 34 inflates and deploys between a head H of the rear seat occupant P and the vehicle body side section (the rear side glass 20), and protects the head H of the rear seat occupant P during a side collision. The gas supply passage 36 is provided in an upper end section of the curtain air bag 30, and mutually communicates an upper section of the front seat chamber 32 and an upper section of the rear seat chamber 34. The previously mentioned connecting passage 37 is extending toward an upward side and a rearward side from an upper end section of this gas supply passage 36.

The rollover chamber 38 inflates and deploys between the front seat chamber 32 and the rear seat chamber 34, and protects the head H of the rear seat occupant P during an oblique collision and a rollover. This rollover chamber 38 is partitioned off from the gas supply passage 36 by a non-inflating section 42 extending in a front-rear direction of the curtain air bag 30. In addition, this rollover chamber 38 is partitioned off from the front seat chamber 32 by a crank-shaped non-inflating section 44 extending to a lower edge section side of the curtain air bag 30 from an intermediate section in a front-rear direction of the non-inflating section 42. A lower end section of this non-inflating section 44 is connected to an outer peripheral non-inflating section 46 configured in an outer peripheral edge section of the curtain air bag 30. A throttling flow path 48 is formed between a rear end section of the non-inflating section 42 and a rear end section of the non-inflating section 44, and the rollover chamber 38 and the rear seat chamber 34 are mutually communicated via the throttling flow path 48.

Figure 2:
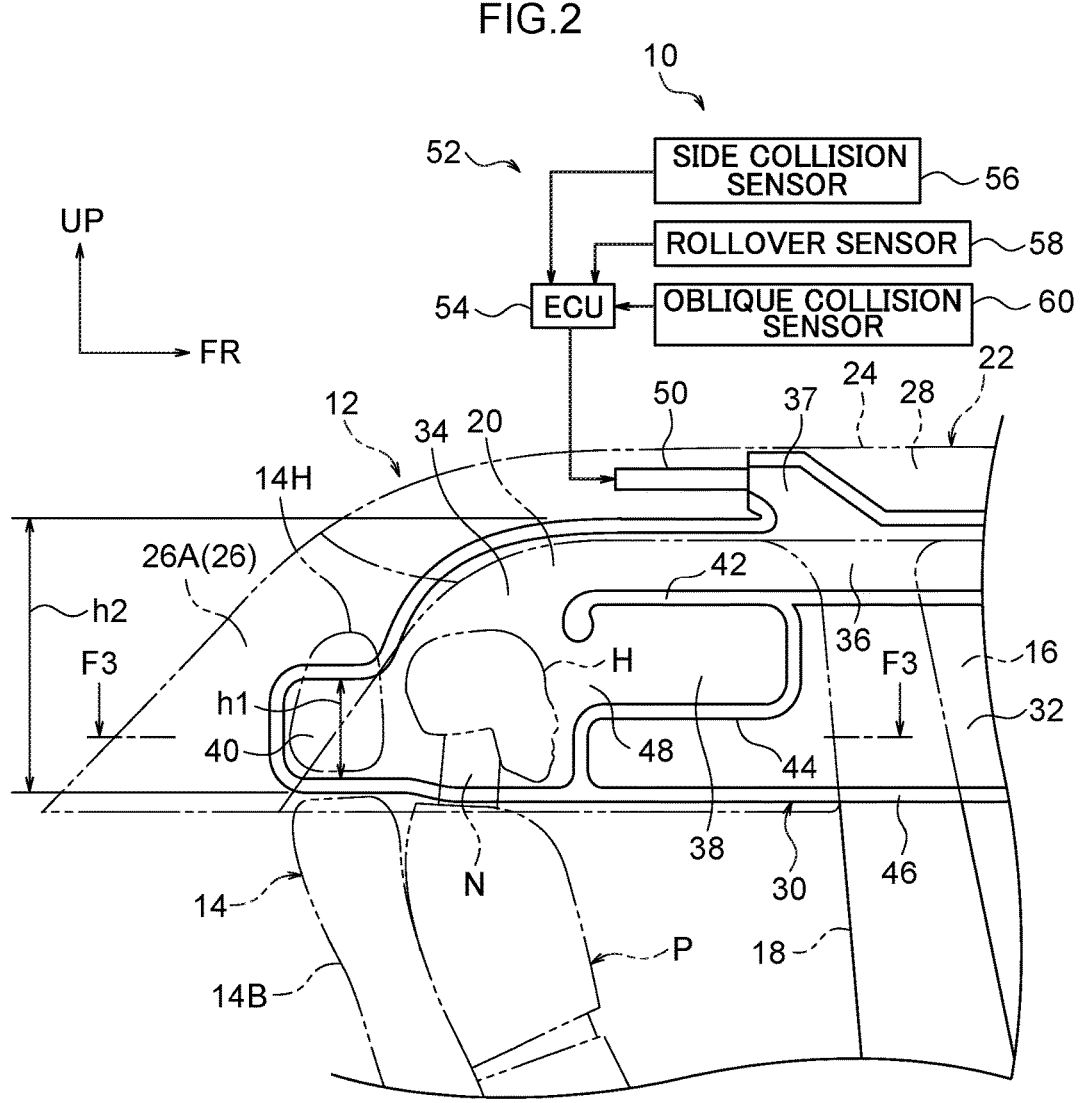
FIG. 2 is a side view in which a part of a configuration shown in FIG. 1 is seen from a vehicle rightward side.
Figure 3:
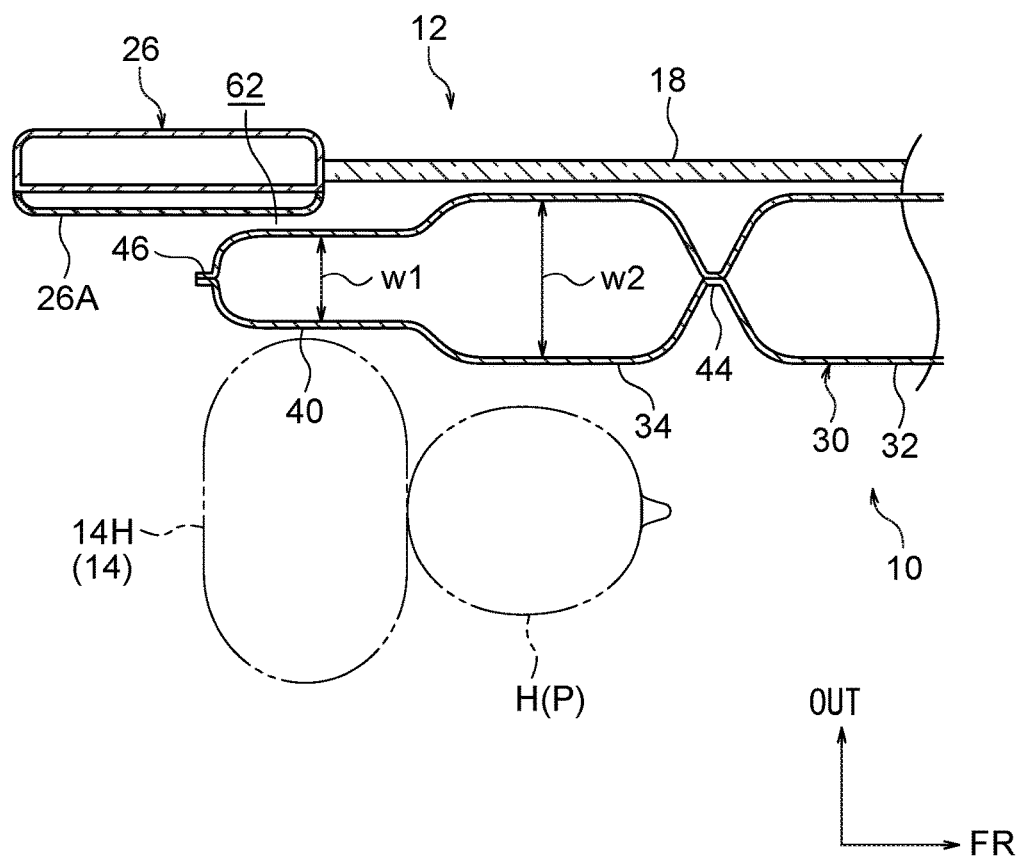
FIG. 3 is an enlarged cross-sectional view showing enlarged a section corresponding to a line F3-F3 of FIG. 2.

The headrest chamber 40 is extending to a rearward side from a lower section of a rear end section of the rear seat chamber 34, and configures a rear end section of the curtain air bag 30. This headrest chamber 40 and the rear seat chamber 34 are mutually communicated. As shown in FIGS. 1 and 3, this headrest chamber 40 inflates and deploys between a headrest 14H of the rear seat 14 and the vehicle body side section (the rear side glass 20 and a C pillar garnish 26A) in the vehicle width direction. As shown in FIG. 2, there is a configuration whereby in a inflated and deployed state of this headrest chamber 40, the headrest chamber 40 and the headrest 14H overlap in vehicle width direction view.

As shown in FIG. 2, this headrest chamber 40 is formed so as to have a substantially rectangular shape when its inflated and deployed state is seen in vehicle width direction view. An inflated width h1 in the vehicle up-down direction of this headrest chamber 40 is set smaller than (in the present embodiment, to about half of) an inflated width h2 in the vehicle up-down direction of the rear seat chamber 34. As a result, as shown in FIG. 3, an inflated width w1 in the vehicle width direction of the headrest chamber 40 is set smaller than an inflated width w2 in the vehicle width direction of the rear seat chamber 34. An internal capacity (internal volume) of this headrest chamber 40 is set sufficiently smaller than an internal capacity (internal volume) of the rear seat chamber 34.

Note that each of the above-described inflated widths can be compared by, for example, inflating the curtain air bag 30 by supplying air to inside the curtain air bag 30 by the likes of an air pump at a normal time. In addition, the headrest 14H of the rear seat 14 is coupled, such that its up-down position is adjustable, to a seat back 14B of the rear seat 14. Moreover, in the present embodiment, there is a configuration whereby the headrest chamber 40 in a inflated and deployed state and the headrest 14H overlap in vehicle width direction view, whichever of states of being positioned at an upper end (upmost position) and a lower end (lowermost position) of an adjustment range of its up-down position with respect to the seat back 14B the headrest 14H is in. Moreover, in the present embodiment, a rear end of the inflated and deployed headrest chamber 40 is configured so as to be positioned in an equivalent position to a rear end of the headrest 14H in the vehicle front-rear direction. Moreover, in the present embodiment, a lower end of the inflated and deployed headrest chamber 40 is configured so as to be positioned slightly more to an upward side than an upper end of the seat back 14B.

Figure 4:
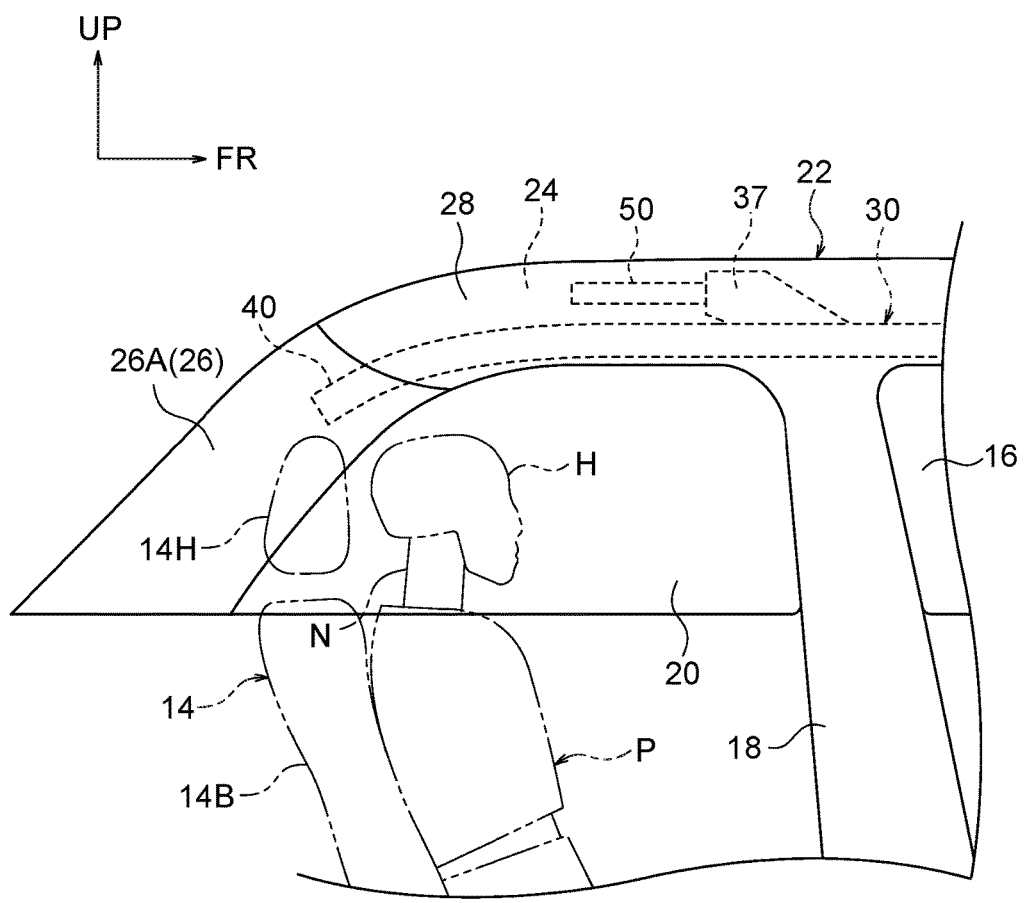
FIG. 4 is a side view corresponding to FIG. 2 showing a folded state of the curtain air bag.

As shown in FIG. 4, the curtain air bag 30 of the above-described configuration, after having been folded in the vehicle up-down direction into a long shape, is housed, along with the inflator 50, in the roof side section 22. A way-of-folding of this curtain air bag 30 is assumed to be a certain way-of-folding including at least one of roll folding and accordion folding, for example. In a housed state of this curtain air bag 30, the curtain air bag 30 extends from the A pillar to the C pillar 26 over the roof side section 22, and the curtain air bag 30 and the inflator 50 are covered from a vehicle interior inner side by an unillustrated A pillar garnish, a roof head lining 28, and the C pillar garnish 26A. In this curtain air bag 30, a region covered by the C pillar garnish 26A includes at least a part of the folded headrest chamber 40.

(Actions and Effects)

Next, actions and effects of the first embodiment will be described.

In the vehicular curtain air bag device 10 of the above-described configuration, when a side collision of the automobile 12 is detected or predicted by the side collision sensor 56, the inflator 50 is actuated by the ECU 54. As a result, a gas from the inflator 50 passes along the connecting passage 37 and the gas supply passage 36 to be supplied to the front seat chamber 32 and the rear seat chamber 34. As a result, the front seat chamber 32 inflates and deploys between the head of the front seat occupant and the front side glass 16, and the rear seat chamber 34 inflates and deploys between the head H of the rear seat occupant P and the rear side glass 20.

In addition, a part of the gas supplied to the front seat chamber 32 passes along an unillustrated throttling flow path to be supplied to the front side oblique collision chamber, and a part of the gas supplied to the rear seat chamber 34 passes along the throttling flow path 48 to be supplied to the rollover chamber 38. As a result, the front side oblique collision chamber and the rollover chamber 38 inflate and deploy later than the front seat chamber 32 and the rear seat chamber 34.

Furthermore, a part of the gas supplied to the rear seat chamber 34 is supplied to the headrest chamber 40, and the headrest chamber 40 inflates and deploys between the headrest 14H of the rear seat 14 and the rear side glass 20 and the C pillar garnish 26A. The inflated and deployed headrest chamber 40 overlaps the headrest 14H in vehicle width direction view. Therefore, when the head H of the rear seat occupant P that moves by inertia to an outer side in the vehicle width direction due to an impact of a side collision plunges into the rear seat chamber 34, and in reaction to this, the head H of the rear seat occupant P and the rear seat chamber 34 rebound to a center side in the vehicle width direction, the headrest chamber 40 abuts on (hits) the headrest 14H. As a result, swing to a center side in the vehicle width direction of the rear seat chamber 34 is suppressed (restricted) using the headrest 14H, hence the above-described swing can be suppressed without employing a rear side strap described in the Related Art section. As a result, while design considerations for pulling out the rear side strap from the C pillar garnish 26A are rendered unnecessary, it can be prevented or effectively suppressed that the rear seat chamber 34 continues to press and accelerate the head H of the rear seat occupant P to a center side in the vehicle width direction.

Figure 5:
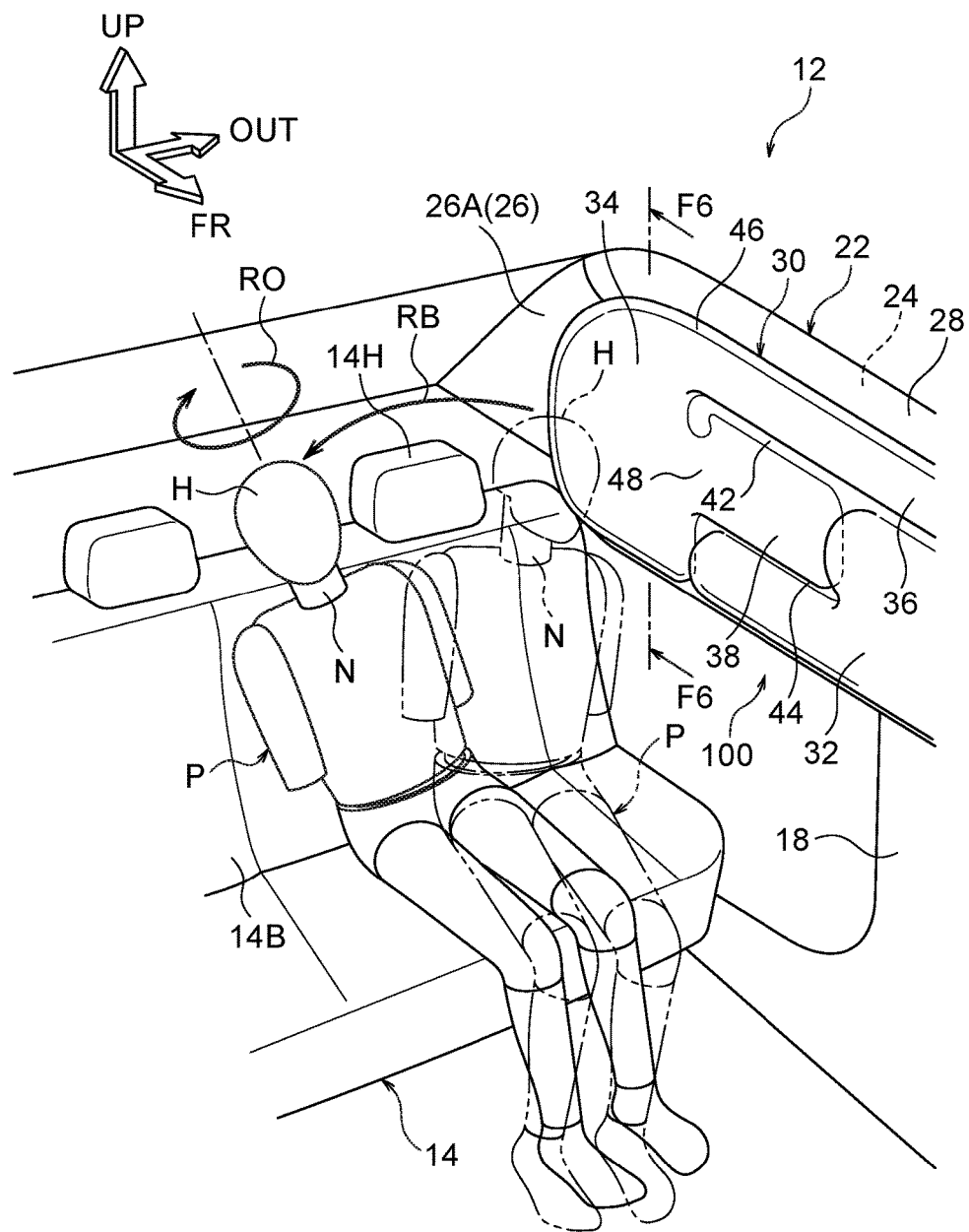
FIG. 5 is a perspective view corresponding to FIG. 1 showing a comparative example.

A supplementary explanation of the above-described effects will be made using a vehicular curtain air bag device 100 (comparative example) shown in FIGS. 5 and 6. Note that in FIGS. 5 and 6, configurations similar to in the present embodiment are assigned with the same reference symbols as in the present embodiment. In this vehicular curtain air bag device 100, the curtain air bag 30 does not include the headrest chamber 40, but configurations other than that are assumed to be similar to in the present embodiment. In this vehicular curtain air bag device 100, similarly to in the present embodiment, the head H of the rear seat occupant P that moves by inertia to an outer side in the vehicle width direction due to an impact of a side collision plunges into the rear seat chamber 34, and in reaction to this, the head H of the rear seat occupant P and the rear seat chamber 34 rebound to a center side in the vehicle width direction (refer to arrow RB in FIGS. 5 and 6).

Figure 6:
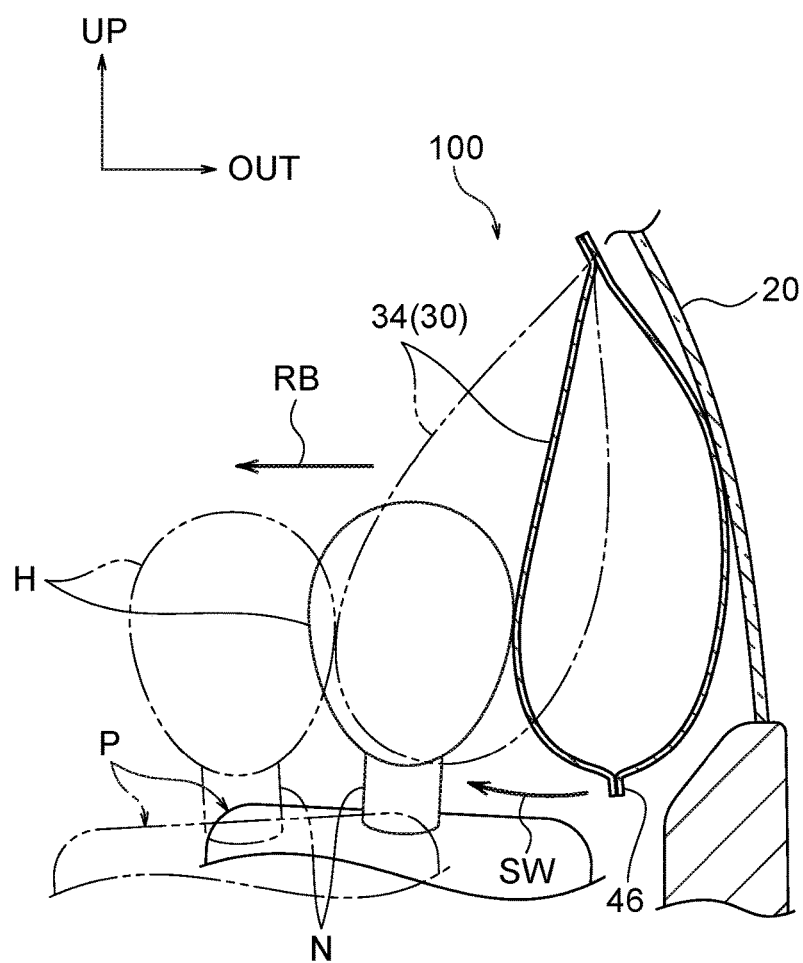
FIG. 6 is an enlarged cross-sectional view showing enlarged a section corresponding to a line F6-F6 of FIG. 5, and is a view for explaining about rebound of a head of a rear seat occupant and a rear seat chamber.

In the above-described process of rebound, the rear seat chamber 34 that swings to a center side in the vehicle width direction as shown by arrow SW in FIG. 6 sometimes continues to press and accelerate the head H to a center side in the vehicle width direction. When the accelerated head H receives a frictional force from the headrest 14H or the seat back 14B, there is a possibility that the head H rotates around an axis of a neck N (refer to arrow RO of FIG. 5) and a head rotational injury (Brain Rotational Injury Criterion; so-called BrIC) occurs. In this respect, since in the present embodiment, the above-described kind of acceleration of the head H and the rotation of the head H accompanying this acceleration can be prevented or effectively suppressed, the present embodiment effectively contributes to preventing occurrence of a head rotational injury.

Moreover, in the present embodiment, the curtain air bag 30 is folded in the vehicle up-down direction to be housed in the upper end section of the vehicle interior side section, and at least a part of the folded headrest chamber 40 is covered from the vehicle interior inner side by the C pillar garnish 26A. Therefore, it is easy to secure a housing space of the headrest chamber 40 extending from the rear end section of the rear seat chamber 34.

Furthermore, in the present embodiment, as shown in FIG. 3, the inflated width w1 in the vehicle width direction of the headrest chamber 40 is formed smaller than the inflated width w2 in the vehicle width direction of the rear seat chamber 34. Therefore, it is easy for the headrest chamber 40 to be inflated and deployed in a gap 62 between the headrest 14H of the rear seat 14 and the rear side glass 20 and the C pillar garnish 26A, even when the gap 62 is narrow.

Moreover, in the present embodiment, since the inflated width h1 in the vehicle up-down direction of the headrest chamber 40 is formed smaller than the inflated width h2 in the vehicle up-down direction of the rear seat chamber 34 as shown in FIG. 2, the headrest chamber 40 can be prevented from having its capacity unnecessarily enlarged. Moreover, when forming the inflated width w1 in the vehicle width direction of the headrest chamber 40 smaller than the inflated width w2 in the vehicle width direction of the rear seat chamber 34, a configuration (a seam, a strap, a tether, or the like) for restricting the inflated width w1 in the vehicle width direction of the headrest chamber 40 becomes unnecessary. Therefore, the present embodiment contributes to simplification of configuration.

Next, another embodiment of the present invention will be described. Note that configurations and actions that are basically similar to those of the previously described first embodiment will be assigned with the same reference symbols as in the previously described first embodiment, and descriptions thereof will be omitted.

Second Embodiment

Figure 7:
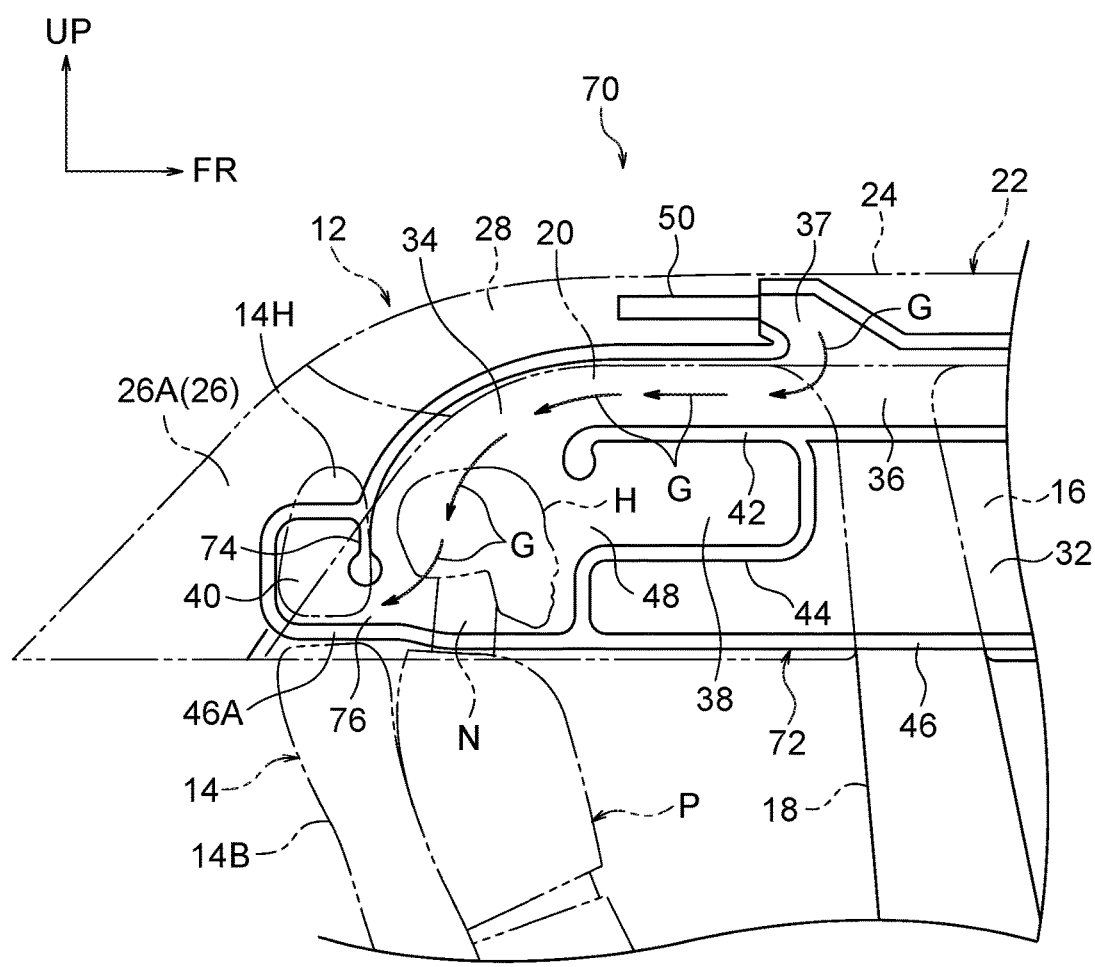
FIG. 7 is a side view corresponding to FIG. 2 showing a inflated and deployed state of a curtain air bag in a vehicular curtain air bag device according to a second embodiment of the present invention.

FIG. 7 shows a inflated and deployed state of a curtain air bag 72 in a vehicular curtain air bag device 70 according to a second embodiment of the present invention, in a side view corresponding to FIG. 2. In this curtain air bag 72, the headrest chamber 40 is configured as a delay chamber. Specifically, in this curtain air bag 72, a non-inflating section 74 is configured between the rear seat chamber 34 and the headrest chamber 40. This non-inflating section 74 is extending toward a lower end side of the curtain air bag 72 from the outer peripheral non-inflating section 46 at a front end and an upper end of the headrest chamber 40. A lower end of this non-inflating section 74 is positioned close to a center section in an up-down direction of the headrest chamber 40, and a throttling flow path 76 is formed between the lower end of the non-inflating section 74 and a lower edge section 46A of the outer peripheral non-inflating section 46. This throttling flow path 76 is formed in a lower end section of the curtain air bag 72, and mutually communicates the rear seat chamber 34 and the headrest chamber 40. As a result, there is a configuration where a part of the gas jetted from the inflator 50 to be supplied to the rear seat chamber 32 passes along the above-described throttling flow path 76 to be supplied to the headrest chamber 40 (refer to arrows G of FIG. 7).

Figure 8A:
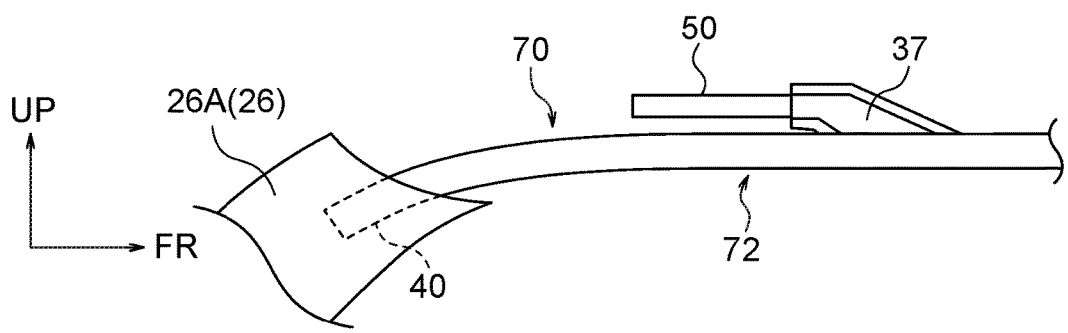
FIG. 8A is a side view showing a folded state of the curtain air bag according to the second embodiment.
Figure 8B:
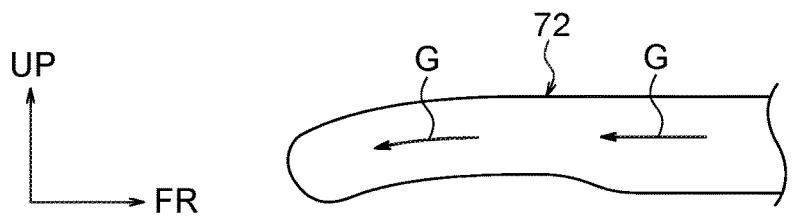
FIG. 8B is a side view showing an initial state of inflation and deployment of same curtain air bag.
Figure 8C:
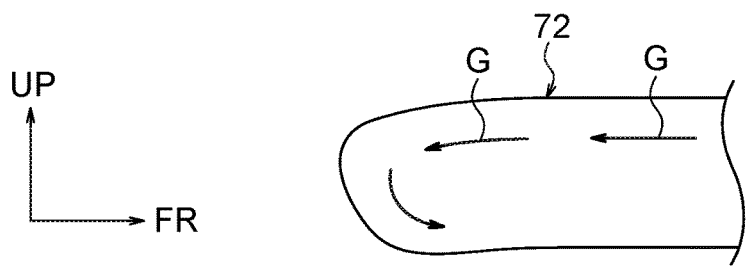
FIG. 8C is a side view showing a state where inflation and deployment is more advanced than in the state shown in FIG. 8B in same curtain air bag.
Figure 8D:
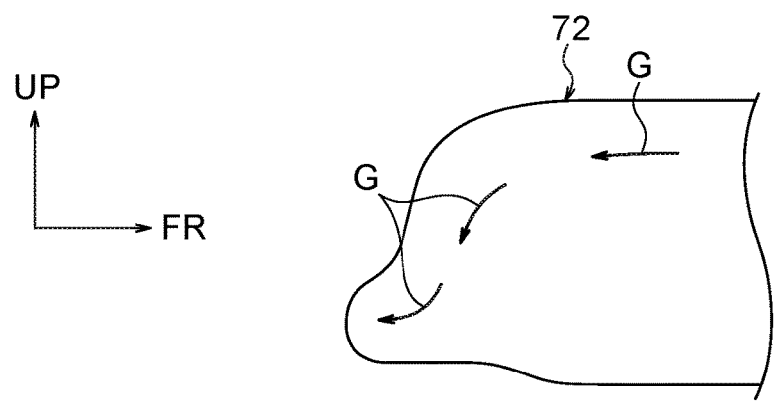
FIG. 8D is a side view showing a state where inflation and deployment is more advanced than in the state shown in FIG. 8C in same curtain air bag.
Figure 8E:
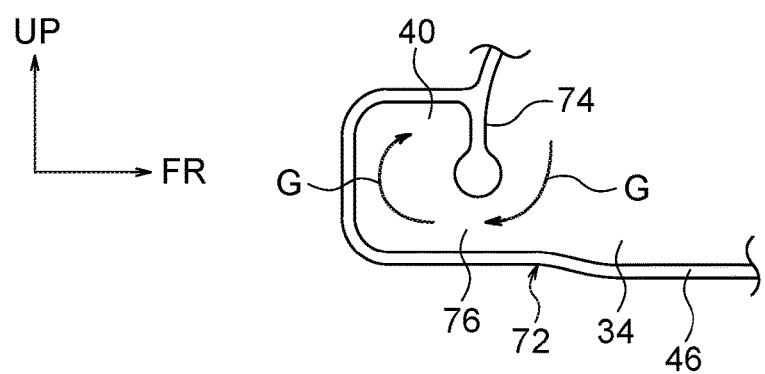
FIG. 8E is a side view showing a state where inflation and deployment is more advanced than in the state shown in FIG. 8D in same curtain air bag.

As shown in FIG. 8A, the curtain air bag 72 configured as described above is folded to be housed in the roof side section 22 (illustration of which is omitted in FIG. 8A) similarly to in the first embodiment. When the inflator 50 actuates in this housed state, the curtain air bag 72 inflates and deploys to a vehicle downward side, as shown chronologically in FIGS. 8B to 8E. Note that arrows G shown in FIGS. 8B to 8E show a flow of gas in the curtain air bag 72. Since, at a time of inflation and deployment of this curtain air bag 72, the throttling flow path 76 is blocked until the curtain air bag 72 inflates and deploys to its lower end section, a delay occurs in inflow of gas to the headrest chamber 40 from the rear seat chamber 34. As a result, there is a configuration whereby the headrest chamber 40 starts to inflate and deploy later than the rear seat chamber 34. Note that in FIGS. 8B to 8D, illustration of the non-inflating sections 42, 44 and the outer peripheral non-inflating section 46 is omitted, and reference symbols of the rear seat chamber 34, the gas supply passage 36, the rollover chamber 38, and the headrest chamber 40 are omitted. In this embodiment, configurations other than those described above are assumed to be similar to in the first embodiment.

In this embodiment, due to the above-described kind of configuration being adopted, the headrest chamber 40 can be inflated and deployed after the headrest chamber 40 has been pulled out to the vehicle interior inner side of the C pillar garnish 26A (illustration of which is omitted in FIGS. 8B to 8E) by inflation and deployment of the rear seat chamber 34. As a result, a load received by the C pillar garnish 26A when the headrest chamber 40 is pulled out to the vehicle interior inner side of the C pillar garnish 26A can be reduced, hence it becomes easy to prevent cracking or shattering of the C pillar garnish 26A.

Figure 9:
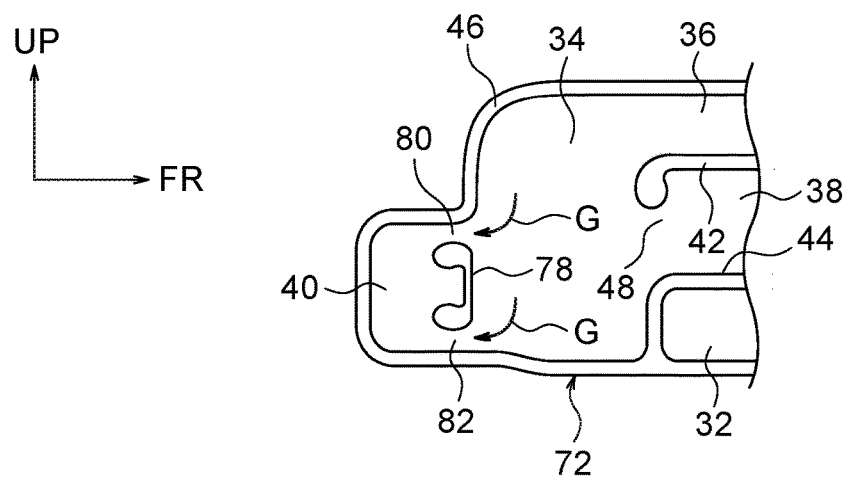
FIG. 9 is a side view showing a first modified example of a headrest chamber which is a delay chamber.

Note that in the above-described second embodiment, a configuration was adopted in which the non-inflating section 74 for configuring the headrest chamber 40 as a delay chamber was extending toward the lower end side of the curtain air bag 72 from the outer peripheral non-inflating section 46 at the front end and the upper end of the headrest chamber 40. However, the present invention is not limited to this. That is, it is possible to configure as in first through third modified examples shown in FIGS. 9 to 11, for example. In the first modified example shown in FIG. 9, a non-inflating section 78 extending in an up-down direction of the curtain air bag 72 is configured in an intermediate section in an up-down direction in a front end section of the headrest chamber 40. Moreover, throttling flow paths 80, 82 are respectively formed on both of upper and lower sides of the curtain air bag 72 with respect to this non-inflating section 78, and the rear seat chamber 34 and the headrest chamber 40 are mutually communicated via these throttling flow paths 80, 82.

Figure 10:
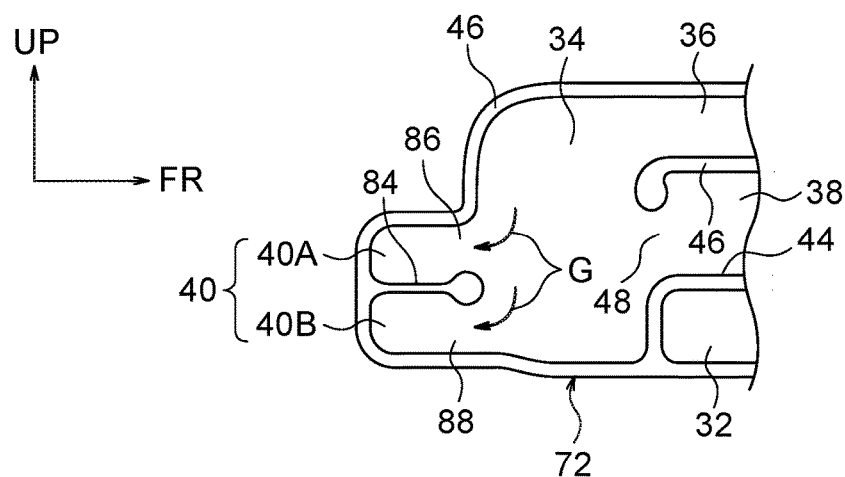
FIG. 10 is a side view showing a second modified example of a headrest chamber which is a delay chamber.
Figure 11:
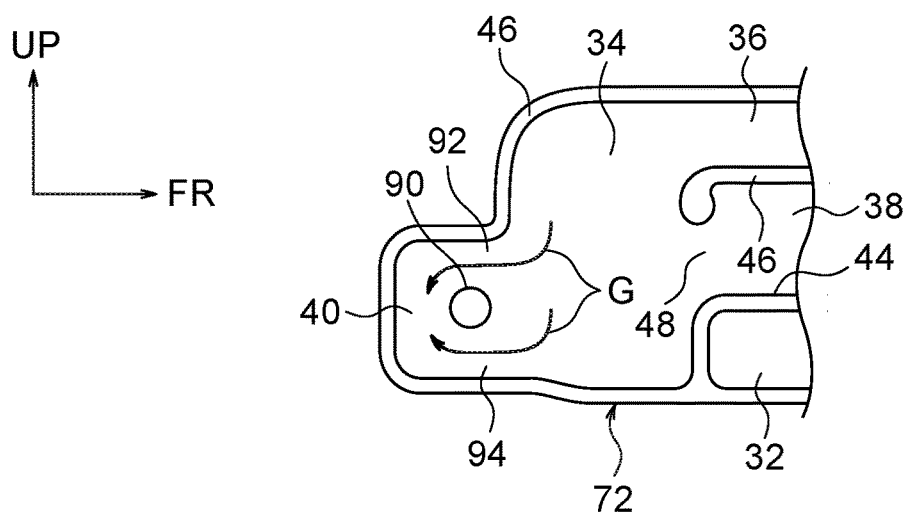
FIG. 11 is a side view showing a third modified example of a headrest chamber which is a delay chamber.

Moreover, in the second modified example shown in FIG. 10, a non-inflating section 84 extending in a front-rear direction of the curtain air bag 72 is configured in an intermediate section in an up-down direction of the headrest chamber 40. As a result, the headrest chamber 40 is partitioned into an upper section 40A and a lower section 40B. The upper section 40A and the lower section 40B are respectively communicated with the rear seat chamber 34 via throttling flow paths 86, 88. Moreover, in the third modified example shown in FIG. 11, a circular non-inflating section 90 is configured in an intermediate section in an up-down direction in a front end section of the headrest chamber 40. Moreover, throttling flow paths 92, 94 are respectively formed on both of upper and lower sides of the curtain air bag 72 with respect to this non-inflating section 90, and the rear seat chamber 34 and the headrest chamber 40 are mutually communicated via these throttling flow paths 92, 94. By changing shapes of the non-inflating sections 78, 84, 90 as in the above-described first through third modified examples, a timing of completion of inflation and deployment of the headrest chamber 40 or the inflated width in the vehicle width direction of the headrest chamber 40 can be arbitrarily changed.

In addition, although the headrest chamber 40 according to each of the previously described embodiments was formed so as to have substantially a rectangular shape when its inflated and deployed state was seen in vehicle width direction view, the present embodiment is not limited to this, and a shape of the headrest chamber 40 may be appropriately changed.

Furthermore, although in each of the previously described embodiments, cases of the vehicular curtain air bag devices 10, 70 being applied to a sedan type automobile 12 (vehicle) were described, the present invention is not limited to this, and the vehicular curtain air bag device according to the present invention may be applied also to a hatchback type vehicle or a vehicle having three rows of seats. In that case, a seat most to a vehicle rearward side will be the rear seat according to the present invention.

In addition, the present invention can be implemented making a variety of modifications in a range not departing from the spirit of the present invention. Moreover, it goes without saying that scope of rights of the present invention is not limited to each of the above-described embodiments.

What is claimed is:

1. A vehicular curtain air bag device comprising a curtain air bag, the curtain air bag including:
    a rear seat chamber configured to inflate and deploy between a head of a rear seat occupant and a vehicle interior side section from an upper end section of the vehicle interior side section; and
    a headrest chamber configured to extend to a rearward side from a lower section of a rear end section of the rear seat chamber, the headrest chamber being configured to inflate and deploy between a headrest of a rear seat and the vehicle interior side section in a vehicle width direction.

2. The vehicular curtain air bag device according to claim 1, wherein
    the curtain air bag is folded in a vehicle up-down direction to be housed in an upper end section of the vehicle interior side section, and at least a part of the folded headrest chamber is covered from a vehicle interior inner side by a C pillar garnish.

3. The vehicular curtain air bag device according to claim 1, wherein
    the headrest chamber is a delay chamber that starts to inflate and deploy later than the rear seat chamber.

4. The vehicular curtain air bag device according to claim 1, wherein
    an inflated width of the headrest chamber, in the vehicle width direction, is smaller than that of the rear seat chamber.

5. The vehicular curtain air bag device according to claim 1, wherein
    an inflated width of the headrest chamber, in a vehicle up-down direction, is smaller than that of the rear seat chamber.

6. The vehicular curtain air bag device according to claim 1, wherein
the curtain air bag further includes a non-inflating section that is configured to be between the rear seat chamber and the headrest chamber.

7. The vehicular curtain air bag device according to claim 1, wherein
an internal capacity of the headrest chamber is configured to be smaller than an internal capacity of the rear seat chamber.

8. The vehicular curtain air bag device according to claim 7, wherein
an inflated width of the headrest chamber, in a vehicle up-down direction, is smaller than that of the rear seat chamber.

9. The vehicular curtain air bag device according to claim 7, wherein
an inflated width of the headrest chamber, in the vehicle width direction, is smaller than that of the rear seat chamber.

10. The vehicular curtain air bag device according to claim 1, wherein
a lower end of the inflated and deployed headrest chamber is configured to be positioned more upward than an upper end of a seat back of the rear seat.

* * * * *